Figure 1:
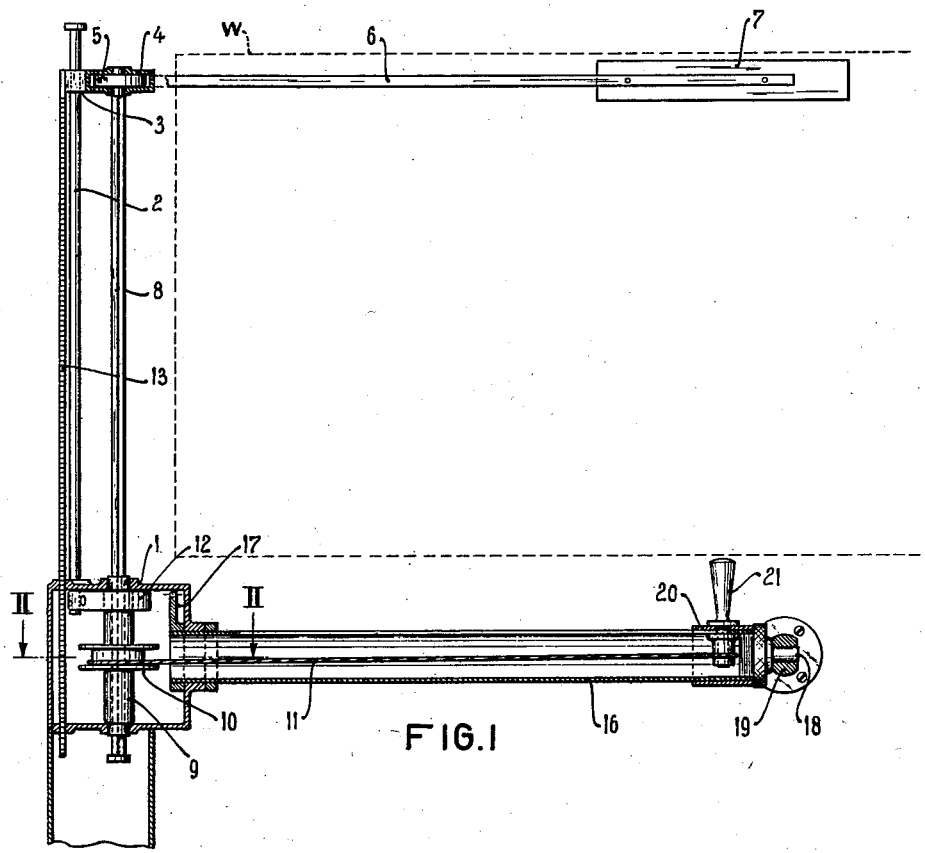

June 16, 1942. P. A. SCHENDELER 2,286,935
GLARE SHIELD
Filed May 11, 1940

PAULUS A. SCHENDELER
INVENTOR
By: Stevens and Davis
ATTYS.

Patented June 16, 1942

2,286,935

UNITED STATES PATENT OFFICE 2,286,935

GLARE SHIELD

Paulus A. Schendeler, Eindhoven, Netherlands

Application May 11, 1940, Serial No. 334,631
In the Netherlands May 26, 1939

2 Claims. (Cl. 296—97)

This invention relates to an antiglare device for a vehicle and has for an object the provision of an adjustable shield adapted for shielding the eyes of the driver of the vehicle from glaring or dazzling light such as that emanating from the headlights of oncoming vehicles.

Various forms of antiglare devices are already known. All of these known devices have the disadvantage that for the adjustment or displacement of the shield the latter must be directly engaged by the driver. If the shield is of small size, so that it obstructs only a small portion of the driver's field of vision, the driver has to move it almost continuously over the wind screen of the vehicle in order to keep it between his eyes and the source of the glare, whereby his effective field of vision is considerably reduced by his own arm and hand. A larger sized shield, which requires less adjustment, constantly covers an excessive part of the normal field of vision.

The object of my invention is to avoid the disadvantages referred to and to provide an antiglare device comprising a shield, which is very small as compared with the effective field of vision and can be operated from a place where the handling of the shield does not interfere with the driver's view.

Another object of the invention is to provide a device, wherein also the size of the supporting means of the shield is reduced to a minimum, so that they do not impair the driver's view either.

According to my invention, the glare shield proper is supported and slightly pressed against the wind screen of the vehicle by a strip of resilient and flexible material, adapted to be wound on a drum rotatably mounted outside the driver's effective field of vision.

In a preferred embodiment of my invention, the said drum is mounted both for rotation, so as to be capable of winding and unwinding the supporting strip of the shield, and for axial displacement, so that the shield has two degrees of movement.

Other objects, advantages and features of the invention will appear from the accompanying drawing, the subjoined detailed description and the appended claims.

Figures 2, 3:
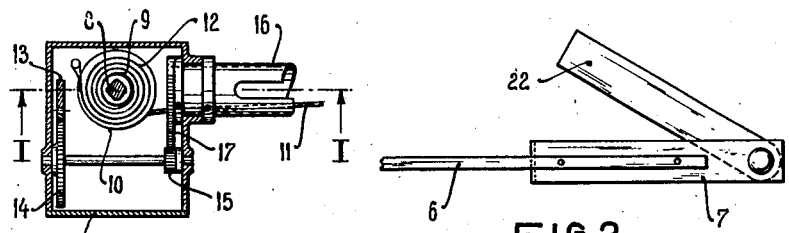
Figures 4, 5:
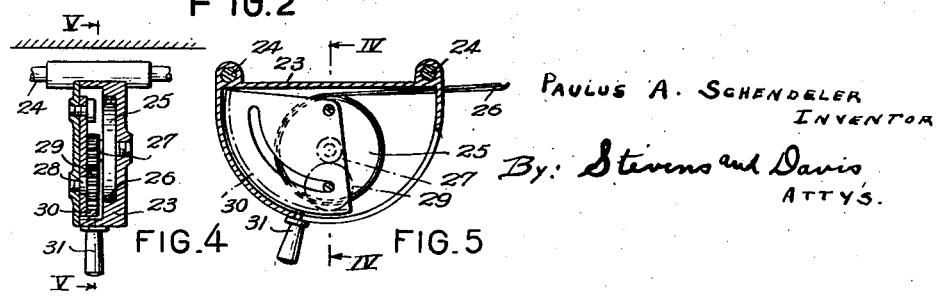

In the drawing:

Fig. 1 is partly a vertical sectional view, partly an elevation of a glare shielding device for a vehicle, wherein the shield proper can be operated with two degrees of movement from a place in the vehicle, which is easily accessible to the driver and lies outside his field of vision, Fig. 2 a horizontal sectional view taken on line II—II of Figure 1, Fig. 3 an elevation of a shield consisting of two parts hinged together, Fig. 4 a horizontal sectional view of part of another embodiment of the invention, and Fig. 5 is a vertical sectional view taken on line V—V of Figure 4.

Referring more particularly to Figs. 1 and 2 of the drawing, 1 indicates a casing mounted near the left hand side bottom corner of the wind screen W, for instance on the dash board of a motor car not shown. The casing 1 supports a guide bar 2, which extends along the left hand side of the wind screen and has its top end suitably secured at a level above the wind screen.

A head 3 is slidably mounted on the guide bar 2 and provided with a box 4, in which a drum 5 is rotatably mounted. Wound on the drum 5 is a narrow steel strip 6 of curved cross section, and secured to the free end of the strip is a relatively small shield 7, which is slightly pressed against the wind screen W by the strip. When the drum 5 is rotated and the steel strip 6 thereby wound or unwound, the shield 7 is horizontally moved over the wind screen, respectively to the left and to the right.

Outside box 4, the shaft 8 of drum 5 has a non-circular cross section. Said extended portion of shaft 8 slidably but non-rotatably engages a bushing 9 rotatably mounted in the casing 1. The bushing 9 carries a drum 10, attached to which is one end of a string 11. The bushing 9 and the drum 10 are loaded by a spiral spring 12 accommodated in casing 1. The drum 10 and the spring 12 cooperate in such a way that, if the string 11 is fully wound on the drum 10, the spring 12 is nearly relaxed. When the string is unwound from the drum 10, the latter together with the bushing 9, the shaft 8 and the drum 5 is turned and spring 12 is tensioned. Consequently, spring 12 is then capable of turning the drum 5 of the steel strip 6 in the opposite direction, if string 11 is released.

Secured to the head 3 is a gear rack 13 passing through the casing 1 and having a sliding fit with the top and bottom walls thereof. The gear rack 13 cooperates with a gear wheel 14, secured to which is a pinion 15, rotatably mounted in casing 1. This pinion meshes with a toothed segment 17 fixed to the left hand side end of a rotatable tube 16 projecting into said casing. At its free right hand side end, the tube 16 is provided with a pivot 18 rotatable in a bearing member 19 secured to any suitable part of the vehicle.

If the tube 16 is rotated, the head 3 and the shield 7 connected thereto by the strip 6 are slid along the shaft 2, so that the shield moves in a more or less vertical direction over the wind screen W.

Slidably mounted on the tube 16 is a sleeve 20 provided with a handle 21. The lower end of the handle 21 projects through an axial slot of the tube 16 and is connected with the right hand side end of the string 11. The sleeve 20 with handle 21 is prevented from rotation relative to the tube 16, so that the handle 21 can be also used to impart rotary motion to the tube 16.

It will be easily understood that the shield 7 moves more or less vertically, when the handle 21 is rotated, and horizontally when the handle 21 is displaced along the tube 16. The shield 7 thus can be moved with two degrees of movement in the field of vision of the driver and constantly kept between his eyes and the source of glaring light.

In order that the active surface of the shield may be varied, the shield may consist of a plurality of parts adapted to be collapsed. Fig. 3 shows a shield composed of an elongated part 7 secured to strip 6, and a second elongated part 22 having one of its ends pivoted to the free end of part 7.

In order to avoid scratching of the wind screen W by the moving glare shield, the latter may be covered with soft material, such as plush or felt.

The illustrated embodiment is intended for use in countries where traffic keeps the right hand side of the road.

It is to be noted that it is not necessary for the tube 16 to be arranged along the lower side of the wind screen W. It may also be mounted in another direction, for instance, from the casing 1 to the steering pillar of the vehicle, or in any other suitable position, provided that handle 21 be easily accessible to the driver.

A very simple embodiment of the invention is illustrated in Figs. 4 and 5. In said embodiment, a casing 23 is slidably mounted on two parallel guide bars 24 suitably secured to the vehicle along the lower side of the wind screen W. Rotatably mounted in a suitable recess of said casing is a drum 25, secured to which is one end of a narrow steel strip 26. Secured to the free end of the strip 26 is a shield (not shown) of the same kind as that illustrated in Fig. 1 or Fig. 3. The drum 25 is provided with a coaxial pinion 27, meshing with a gear wheel 29, which is engaged by a rotatable internally toothed segment 30. The gear wheel 29 is rotatably mounted on a pivot 28 fixed to the side wall of the casing 23. The toothed segment 30 is provided with a handle 31 extending through the front wall of the casing 23. When the toothed segment is swung in the one or in the other direction, the steel strip 26 is unwound or wound and the shield is moved in a vertical direction. In order that the shield may be moved horizontally, the entire casing 23 can be displaced over the guide bars 24 from the left to the right, and vice versa. The steel band 26 can be stiffened by bending it athwartly so that it has a bent cross section.

It is to be understood that the invention, which substantially consists in the provision of a relatively very small shield, that is adjustable and movable from a suitable place outside the field of vision of the driver, is susceptible to variation, modification and change within the gist and scope of the subjoined claims.

What I claim is:

1. An apparatus for shielding the eyes of the driver of a vehicle from glaring light such as that emanating from the headlights of oncoming vehicles, comprising an adjustable shield having two degrees of movement, a strip of resilient and flexible material having one end secured to the shield, a drum attached to which is the other end of the strip, a casing in which the drum is rotatably mounted, a guide bar adapted to be secured to the vehicle outside the effective field of vision of the driver of the vehicle and supporting the casing in such a way that the latter is slidable in a direction parallel to the axis of the drum but prevented from rotation, a gear accommodated in the casing and operatively coupled with the drum, and a handle rockably mounted on the casing for imparting rotary movement to said gear.

2. An apparatus for shielding the eyes of the driver of a vehicle from glaring light such as that emanating from the headlights of oncoming vehicles, comprising an adjustable shield having two degrees of movement, a strip of resilient and flexible material having one end secured to the shield, a drum attached to which is the other end of the strip, a sliding head in which the drum is rotatably mounted, a guide bar on which the sliding head can be displaced in a direction parallel to the axis of the drum, a casing supporting the guide bar, a toothed rack having one end secured to the sliding head, a shaft of non-circular cross section having one end fixed to the drum, both the toothed rack and the shaft being passed through the wall of the casing and having a sliding fit therewith, a second drum rotatably mounted in the casing and slidably but non-rotatably engaging the shaft of the first drum, a tube having one end rotatably passed through a wall of the casing, a bracket rotatably supporting the other end of the tube, an axial slot in the wall of said tube, a toothed segment fixed to the tube, a gear operatively engaging both the toothed segment and the toothed rack, a sleeve slidably but non-rotatably mounted on the tube, a handle fixed to the sleeve and projecting through said slot, a string having its one end connected to the handle and its other end connected to the second drum, and a spring having its ends secured to the casing and to the second drum respectively and tending to wind the string on the second drum, said guide bar casing and bracket being adapted to be secured to the vehicle outside the effective field of vision of the driver and the arrangement being such that the shield is moved horizontally and vertically when the sleeve is displaced over the tube and the tube is rotated, respectively.

PAULUS A. SCHENDELER.